United States Patent
Liu et al.

(10) Patent No.: US 11,585,253 B2
(45) Date of Patent: Feb. 21, 2023

(54) CONVERGING LIQUID REDUCTANT INJECTOR NOZZLE IN SELECTIVE CATALYTIC REDUCTION SYSTEMS

(71) Applicant: Cummins Emission Solutions Inc., Columbus, IN (US)

(72) Inventors: Z. Gerald Liu, Madison, WI (US); Achuth Munnannur, Madison, WI (US); Niklas Schmidt, Madison, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 501 days.

(21) Appl. No.: 15/227,724

(22) Filed: Aug. 3, 2016

(65) Prior Publication Data

US 2017/0037759 A1    Feb. 9, 2017

Related U.S. Application Data

(60) Provisional application No. 62/202,574, filed on Aug. 7, 2015.

(51) Int. Cl.
 *F01N 3/20* (2006.01)
(52) U.S. Cl.
 CPC ........ *F01N 3/2066* (2013.01); *F01N 2610/02* (2013.01); *F01N 2610/1453* (2013.01); *Y02T 10/12* (2013.01)
(58) Field of Classification Search
 CPC ............... F01N 3/2066; F01N 2610/02; F01N 2610/1453; F01N 3/00; Y10T 137/86372;
 (Continued)

(56) References Cited

U.S. PATENT DOCUMENTS

| 2,677,231 A | * | 5/1954 | Cornelius | ................. F01N 3/26 422/176 |
| 5,647,316 A |   | 7/1997 | Hellen et al. | |

(Continued)

FOREIGN PATENT DOCUMENTS

| CN | 88101288 A | 9/1988 |
| CN | 1935335    | 3/2007 |

(Continued)

OTHER PUBLICATIONS

CN Office Action issued in CN application No. 2016106360160, dated Aug. 20, 2018, p. 1-11.

(Continued)

*Primary Examiner* — Christopher R Dandridge
(74) *Attorney, Agent, or Firm* — Foley & Lardner LLP

(57) ABSTRACT

A liquid reductant injector nozzle includes a first portion defining a hollow cylindrical static chamber, in fluid communication with second portion defining a hollow frusto-conical converging section, which is in turn in fluid communication with a sharp edged type discharge orifice. The hollow cylindrical static chamber is in reductant receiving communication with a reductant source, and has a first and second circular opening having equal diameters. The second circular opening is downstream of the first circular opening. The hollow frustoconical converging section is in reductant receiving communication with the hollow cylindrical static chamber via the second circular opening. Reductant received from the reductant source is discharged through the discharge orifice. A sidewall of the hollow cylindrical static chamber and a frustum side of the frustoconical converging section define an angle of convergence of the liquid reductant injector nozzle relative to a plane of the second circular opening.

8 Claims, 3 Drawing Sheets

(58) Field of Classification Search
CPC ..... Y10T 137/87249; Y10T 137/87265; Y10T 137/877; Y10T 137/86212
See application file for complete search history.

(56) References Cited

U.S. PATENT DOCUMENTS

| | | | |
|---|---|---|---|
| 5,746,986 A * | 5/1998 | Pollock | B01D 53/8653 |
| | | | 181/264 |
| 5,900,222 A | 5/1999 | Ito et al. | |
| 5,988,115 A | 11/1999 | Anderson et al. | |
| 6,030,204 A | 2/2000 | Breen et al. | |
| 6,048,510 A | 4/2000 | Zauderer | |
| 6,120,131 A | 9/2000 | Murthy et al. | |
| 6,216,755 B1 | 4/2001 | Neufert | |
| 6,263,924 B1 | 7/2001 | Grosser | |
| 6,382,600 B1 | 5/2002 | Mahr | |
| 6,387,336 B2 | 5/2002 | Marko et al. | |
| 6,415,602 B1 | 7/2002 | Patchett et al. | |
| 6,581,374 B2 | 6/2003 | Patchett et al. | |
| 6,632,967 B2 | 10/2003 | Scholten et al. | |
| 6,662,553 B2 | 12/2003 | Patchett et al. | |
| 6,742,330 B2 | 6/2004 | Genderen | |
| 6,848,251 B2 | 2/2005 | Ripper et al. | |
| 6,886,762 B2 * | 5/2005 | Angelino | F02B 1/12 |
| | | | 251/360 |
| 6,928,807 B2 | 8/2005 | Jacob et al. | |
| 7,150,145 B2 | 12/2006 | Patchett et al. | |
| 7,229,597 B2 | 6/2007 | Patchett et al. | |
| 7,278,625 B2 | 10/2007 | Huber et al. | |
| 7,435,400 B2 | 10/2008 | Zauderer | |
| 7,448,206 B2 | 11/2008 | Meingast et al. | |
| 7,481,042 B2 | 1/2009 | Mahr | |
| 7,497,075 B2 | 3/2009 | Ripper et al. | |
| 7,497,077 B2 | 3/2009 | Dodge et al. | |
| 7,506,826 B2 | 3/2009 | Miller | |
| 7,553,463 B2 | 6/2009 | Zauderer | |
| 7,571,599 B2 | 8/2009 | Hirata | |
| 7,571,603 B2 | 8/2009 | Ripper et al. | |
| 7,584,604 B2 * | 9/2009 | Masaki | F01N 3/2066 |
| | | | 60/286 |
| 7,594,393 B2 | 9/2009 | Offenhuber et al. | |
| 7,594,516 B2 | 9/2009 | Maisch et al. | |
| 7,712,304 B2 | 5/2010 | Mayer et al. | |
| 7,712,307 B2 | 5/2010 | Braun et al. | |
| 7,743,603 B2 | 6/2010 | Nishina et al. | |
| 7,762,061 B2 * | 7/2010 | Birkby | F01N 3/2066 |
| | | | 60/286 |
| 7,849,676 B2 | 12/2010 | Witte-Merl | |
| 7,902,107 B2 | 3/2011 | Patchett et al. | |
| 7,975,470 B2 | 7/2011 | Hirata et al. | |
| 7,986,870 B2 | 7/2011 | Bruck et al. | |
| 8,004,695 B1 | 8/2011 | Kaemingk et al. | |
| 8,056,671 B2 | 11/2011 | Ikegami et al. | |
| 8,074,673 B2 | 12/2011 | Maisch et al. | |
| 8,122,603 B2 | 2/2012 | Patchett et al. | |
| 8,155,509 B2 | 4/2012 | Bruck et al. | |
| 8,161,735 B2 | 4/2012 | Kitazawa | |
| 8,201,393 B2 | 6/2012 | Zapf et al. | |
| 8,209,966 B2 | 7/2012 | Sakata et al. | |
| 8,220,253 B2 | 7/2012 | Werni et al. | |
| 8,220,660 B2 | 7/2012 | Smith | |
| 8,240,137 B2 | 8/2012 | Liu et al. | |
| 8,266,892 B2 | 9/2012 | Zapf et al. | |
| 8,266,894 B2 | 9/2012 | Perrin et al. | |
| 8,276,437 B2 | 10/2012 | Kitazawa | |
| 8,297,050 B2 | 10/2012 | Ranganathan et al. | |
| 8,297,537 B2 | 10/2012 | Miller et al. | |
| 8,407,990 B2 | 4/2013 | Bruck et al. | |
| 8,470,274 B2 | 6/2013 | Maus et al. | |
| 8,479,496 B2 | 7/2013 | Gonze et al. | |
| 8,484,950 B2 | 7/2013 | Witte-Merl et al. | |
| 8,484,957 B2 | 7/2013 | Hodgson et al. | |
| 8,528,390 B2 | 9/2013 | Von Meduna et al. | |
| 8,549,841 B2 | 10/2013 | Hodgson et al. | |
| 8,607,550 B2 | 12/2013 | Tangemann et al. | |
| 8,622,316 B2 | 1/2014 | Haeberer et al. | |
| 8,636,175 B2 | 1/2014 | Smith | |
| 8,671,663 B2 | 3/2014 | Buerglin et al. | |
| 8,695,330 B2 | 4/2014 | Davidson et al. | |
| 8,713,922 B2 | 5/2014 | Yano et al. | |
| 8,726,643 B2 | 5/2014 | Way et al. | |
| 8,745,973 B2 | 6/2014 | Mullins et al. | |
| 8,752,365 B2 | 6/2014 | Campbell et al. | |
| 8,756,918 B2 | 6/2014 | Campbell et al. | |
| 8,776,499 B2 | 7/2014 | Huennekes et al. | |
| 8,800,268 B2 | 8/2014 | Voss et al. | |
| 8,845,973 B2 | 9/2014 | Bruck | |
| 8,875,491 B2 | 11/2014 | Zapf et al. | |
| 8,875,499 B2 | 11/2014 | Kawada et al. | |
| 8,875,502 B2 | 11/2014 | Fuchs et al. | |
| 8,888,017 B2 | 11/2014 | Ponnathpur et al. | |
| 8,899,023 B2 | 12/2014 | Patchett et al. | |
| 8,915,068 B2 | 12/2014 | Haeberer | |
| 8,943,812 B2 | 2/2015 | Schepers et al. | |
| 2005/0028874 A1 * | 2/2005 | Olbert | B01J 8/0085 |
| | | | 137/592 |
| 2014/0102084 A1 * | 4/2014 | Toshev | F01N 3/18 |
| | | | 60/301 |

FOREIGN PATENT DOCUMENTS

| | | |
|---|---|---|
| CN | 2923045 | 7/2007 |
| CN | 201871432 | 6/2011 |
| CN | 102913310 | 2/2013 |
| EP | 1800745 | 6/2007 |
| JP | 2007100672 | 4/2007 |

OTHER PUBLICATIONS

Second Office Action issued for Chinese Patent Application No. 2016106360160, dated Apr. 28, 2019, 11 pages.

* cited by examiner

CONVERGING LIQUID REDUCTANT INJECTOR NOZZLE IN SELECTIVE CATALYTIC REDUCTION SYSTEMS

CROSS-REFERENCE TO RELATED APPLICATIONS

The present application claims priority to U.S. Provisional Patent Application No. 62/202,574, filed Aug. 7, 2015 and the contents of which are incorporated herein by reference for all purposes.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a Selective Catalytic Reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or aqueous urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to a liquid reductant injector nozzle with a converging section. The liquid reductant injector nozzle described herein is capable of introducing a liquid reductant into a stream of exhaust gases containing pollutants so as to produce a well-atomized spray with high part-to-part and cycle-to-cycle repeatability when a prescribed pressure differential is applied.

One implementation relates to a liquid reductant injector nozzle that includes a first portion defining a hollow cylindrical static chamber, and a second portion defining a hollow frustoconical converging section and a discharge orifice. The hollow cylindrical static chamber is in reductant receiving communication with a reductant source, and has a first opening and a second. The second opening is downstream of the first opening. The hollow frustoconical converging section is in fluid communication with the hollow cylindrical static chamber and a discharge orifice to discharge reductant received from the reductant source. The hollow frustoconical converging section is in reductant receiving communication with the hollow cylindrical static chamber via the second opening. A sidewall of the hollow cylindrical static chamber and a frustum side of the frustoconical converging section define an angle of convergence of the liquid reductant injector nozzle relative to a plane of the second opening.

In some implementations, the liquid reductant injector nozzle includes a central entrance section upstream of and in fluid communication with the static chamber via a liquid delivery channel. In some implementations, the diameter of the hollow cylindrical static chamber is 500 microns or less. In some implementations, the angle of convergence is between 15 degrees, inclusive, and 90 degrees. In some implementations, the discharge orifice has a diameter of 200 microns or less. In some implementations, the first opening of the hollow cylindrical static chamber is circular. In some implementations, the second opening of the hollow cylindrical static chamber is circular. In some implementations, the first opening and the second opening have equal diameters. In some implementations, the discharge orifice is of a sharp edged type.

Another implementation relates to a liquid reductant injector nozzle that includes a first portion defining two or more hollow cylindrical static chambers, a second portion defining two or more hollow frustoconical converging sections, and a third portion defining a central entrance section and two or more liquid delivery channels. Each of the two or more hollow cylindrical static chambers are in reductant receiving communication with a liquid delivery channel. The first portion defines a first opening of each of the two or more hollow cylindrical static chambers and a second opening of each of the two or more hollow cylindrical static chambers. Each second opening is downstream of each corresponding first opening. The two or more hollow frustoconical converging sections are each in fluid communication with a corresponding hollow cylindrical static chamber of the two or more hollow cylindrical static chambers. The two or more hollow frustoconical converging sections are also each in fluid communication with a corresponding discharge orifice to discharge reductant received from the reductant source. Each hollow frustoconical converging section is in reductant receiving communication with the second opening of the corresponding hollow cylindrical static chamber. The central entrance section is upstream of the first portion and is in reductant receiving communication with a reductant source. Each of the two or more liquid delivery channels is in fluid communication with the central entrance section at a first end and a corresponding hollow cylindrical static chamber of the two or more hollow cylindrical static chambers at a second end. A sidewall of each of the two or more hollow cylindrical static chambers and a frustum side of each of the two or more frustoconical converging sections define an angle of convergence of the liquid reductant injector nozzle relative to a plane of the second circular opening.

In some implementations, the diameter of each hollow cylindrical static chamber is 500 microns or less. In some implementations, each of the angles of convergence is between 15 degrees, inclusive, and 90 degrees. In some implementations, each of the discharge orifices ha a diameter of 200 microns or less. In some implementations, the first opening of each hollow cylindrical static chamber is circular. In some implementations, the second opening of each hollow cylindrical static chamber is circular. In some implementations, the first opening and the second opening of each hollow cylindrical static chamber have equal diameters. In some implementations, the discharge orifice is of a sharp edged type.

Another implementation relates to an apparatus comprising a reductant source, a doser, and a liquid reductant injector nozzle. The decomposition chamber is configured to convert reductant from the reductant source into ammonia. The doser is in reductant receiving communication with reductant source. The liquid reductant injector nozzle is in reductant receiving communication with the doser. The liquid reductant injector nozzle is positioned so to provide the reductant to the decomposition chamber. The liquid reductant injector nozzle comprises a first portion defining a hollow cylindrical static chamber, the first portion defining a first opening of the hollow cylindrical static chamber and a second opening of the hollow cylindrical static chamber, the second opening downstream of the first opening. The liquid reductant injector nozzle further comprises a second portion defining a hollow frustoconical converging section in fluid communication with the hollow cylindrical static chamber and a discharge orifice to discharge the reductant to the decomposition chamber, the hollow frustoconical converging section in reductant receiving communication with the hollow cylindrical static chamber via the second circular opening. A sidewall of the hollow cylindrical static chamber and a frustum side of the frustoconical converging section define an angle of convergence of the liquid reductant injector nozzle relative to a plane of the second circular opening. In some implementations, the first opening and the second opening have equal diameters. The discharge orifice may be of a sharp edged type.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
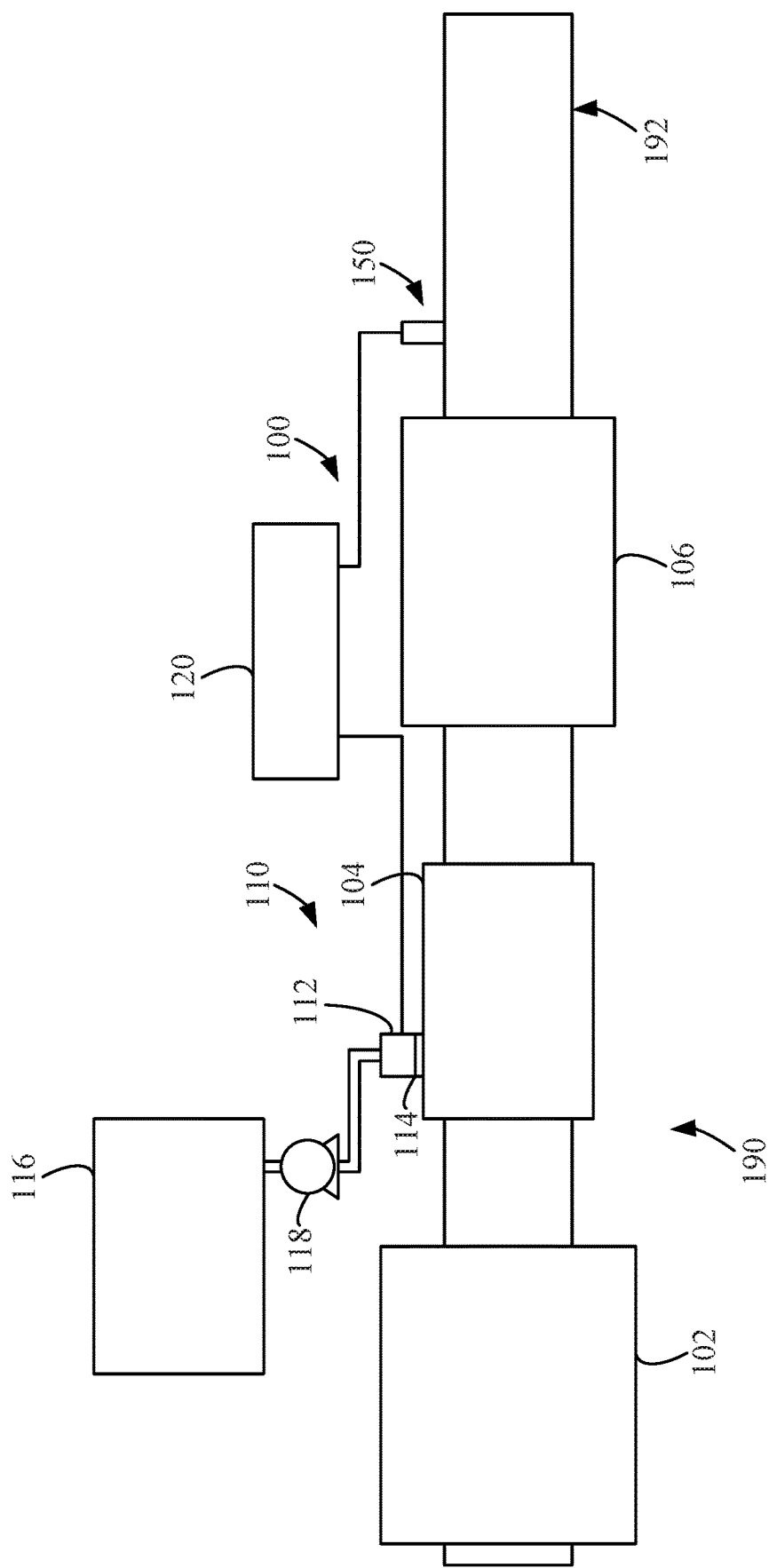
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a liquid reductant injector nozzle with a converging section. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In many mobile SCR systems, a liquid reductant such as an aqueous urea solution (DEF) is injected upstream of an SCR catalyst. Liquid reductant droplets then undergo the processes of evaporation, thermolysis, and hydrolysis to form gaseous ammonia which helps to chemically reduce the harmful oxides of nitrogen present in engine exhaust to less harmful compounds. SCR catalysts are employed to carry out the $NO_x$ reduction process. The present disclosure is related to design of a liquid reductant injector nozzle that produces a well-atomized spray with high part-to-part and cycle-to-cycle repeatability when a prescribed pressure differential is applied.

In some instances, liquid reductant injector nozzles have only straight sections, meaning that the diameter of the section is constant from upstream to downstream. Nozzles with only straight sections, however, do not accelerate the liquid to enhance primary atomization. Furthermore, the absence of enough static chambers causes spray asymmetry due to the angled momentum of the liquid being discharged. In other instances, liquid reductant injector nozzles have diverging sections upstream of the discharge orifice. Nozzles with diverging sections upstream of the discharge orifice, however, create an unfavorable pressure gradient, leading to the lowering of the pressure differential that drives atomization. Furthermore, these nozzles may create recirculation zones, leading to spray impingement on walls and subsequent solid deposit formation and increased part-to-part or cycle-to-cycle variability.

Implementations described herein relate to a liquid reductant injector nozzle with a converging section, meaning that the diameter of the section is smaller downstream than it is upstream. The liquid reductant injector nozzle described herein is capable of introducing a liquid reductant into a stream of exhaust gases containing pollutants so as to produce a well-atomized spray with high part-to-part and cycle-to-cycle repeatability when a prescribed pressure differential is applied. This capability significantly improves the spray parameters and, therefore, $deNO_x$ efficiency of SCR systems, concurrently reducing chances of forming solid deposits and maintaining sufficient mechanical strength to withstand the pressure increase from solidification or freezing of the liquid reductant when it is exposed to low temperatures.

One implementation relates to a liquid reductant injector nozzle consisting of a static chamber fluidly connected to a converging section, which is in turn fluidly connected to a sharp-edged discharge orifice. Liquid reductant from a reductant source enters the static chamber and flows downstream through the converging section, and is then discharged through the discharge orifice into the exhaust stream as a well-atomized spray. The addition of the converging section creates an efficient conversion of pressure energy to kinetic energy, helps with primary atomization, and produces a well-atomized spray with low part-to-part or cycle-to-cycle variability. Including a converging section also helps to maintain the durability of the discharge orifice and to mitigate deposits.

In some implementations, the liquid reductant injector nozzle is a multiple-chamber liquid reductant injector nozzle. This multiple-chamber liquid reductant injector nozzle consists of an entrance section that is fluidly connected to multiple static chambers, each of which are fluidly connected to corresponding converging sections, which are in turn fluidly connected to corresponding sharp-edged discharge orifices. Liquid reductant from a reductant source enters the entrance section and flows downstream into each of the multiple static chambers and then into each of the converging sections, and is then discharged through the discharge orifices into the exhaust stream in a well-atomized spray. The addition of the converging section creates an efficient conversion of pressure energy to kinetic energy, helps with primary atomization, and produces a well-atomized spray with low part-to-part or cycle-to-cycle variability. Including a converging section also helps to maintain the durability of the discharge orifice and to mitigate deposits.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or diesel exhaust fluid (DEF), into ammonia. The decomposition chamber 104 includes a reductant delivery system 110 having a doser or dosing module 112 configured to dose the reductant into the decomposition chamber 104 (for example, via an injector such as the injection nozzle arrangements described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Example Liquid Reductant Injection Nozzle

Figure 2:
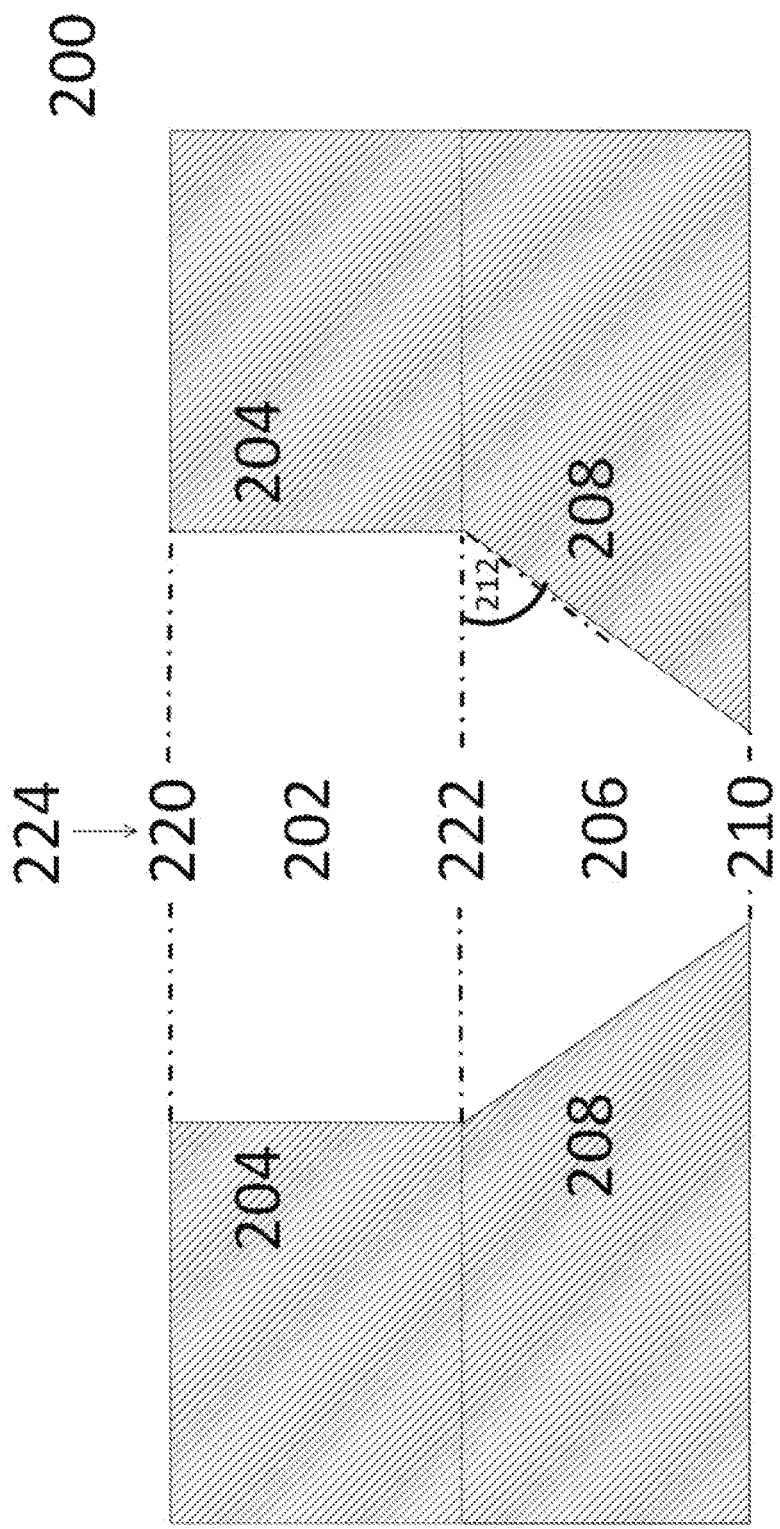
FIG. 2 is a cross-sectional view of a liquid reductant injection nozzle.
Figure 3:
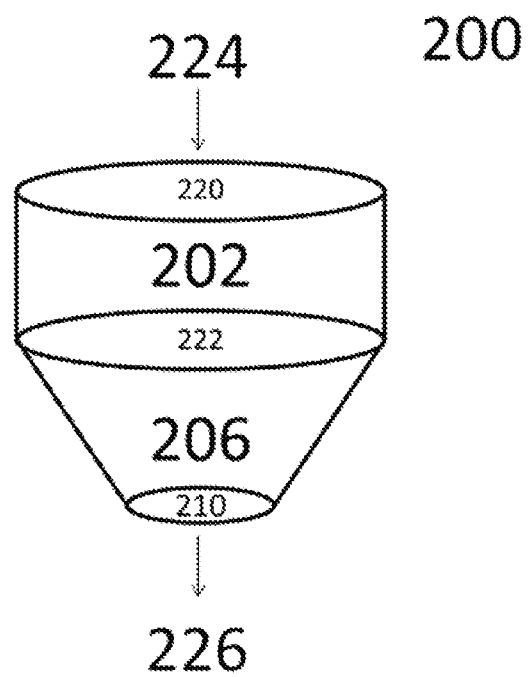
FIG. 3 is a three-dimensional drawing of the static chamber and converging section of the liquid reductant injection nozzle of FIG. 2.

FIG. 2 depicts the cross section of a liquid reductant injection nozzle 200. FIG. 3 depicts a three dimensional view of the same liquid reductant injection nozzle 200. The liquid reductant injection nozzle 200 includes a first portion 204 defining a hollow cylindrical static chamber 202, a second portion 208 defining a hollow frustoconical converging section 206, and a sharp edged type discharge orifice 210 (i.e., the discharge orifice possesses a sharp edge at its inner circumferential surface). The first portion 204 may have a height of approximately 2000 micrometers (μm), inclusive, or less. The second portion 208 may have a height of approximately 1000 μm, inclusive, or less.

The hollow cylindrical static chamber 202 is in fluid communication with the hollow frustoconical converging section 206, which is in turn in fluid communication with the sharp edged type discharge orifice 210. The diameter of the sharp edged discharge orifice 210 may have a diameter of 200 μm, inclusive, or less.

The static chamber 202 is configured to receive liquid reductant 224 at a first circular opening 220 from the reductant source 116 via the doser. The diameter of the first circular opening 220 may be from 200 μm, inclusive, to 2000 μm, inclusive. The velocity of the liquid reductant 224 is reduced in the static chamber 202. As the liquid reductant 224 moves downstream through the second circular opening 222 and enters the converging section 206, the liquid reductant 224 becomes confined and gradually accelerates to a greater velocity between the second circular opening 222 and the discharge orifice 210. Finally, the accelerated liquid reductant 224 is discharged through the center of the discharge orifice 210 into the exhaust stream 226, where its liquid pressure drops significantly (5 bar gage or higher) and the liquid reductant 224 becomes atomized into small droplets. Downstream of the discharge orifice 210, the droplets of liquid reductant 224 behave as a free stream spray, which minimizes the liquid reductant's 224 undesirable contact with the exterior of the first portion 204 or the second portion 208 through recirculation, impingement, or coalescence.

In particular embodiments, the static chamber 202 has a diameter below 2 millimeters, more specifically 500 microns or less, while the discharge orifice 210 has a diameter less than 250 microns, more specifically 200 microns or less. The depth of the static chamber 202 is below 500 microns. The length of the converging section 206 is less than 1000 microns. The angle of convergence 212, measured in the converging section 206 between a plane defining the second circular opening 222 and the side wall 208 of the converging section 206, is between 15 degrees, inclusive, and 90 degrees, more specifically 85 degrees or below. The liquid reductant 224 may be an aqueous urea solution. The exhaust stream 226 may contain pollutant gases such as oxides of nitrogen.

IV. Example Multiple-Chamber Liquid Reductant Injection Nozzle

Figure 4:
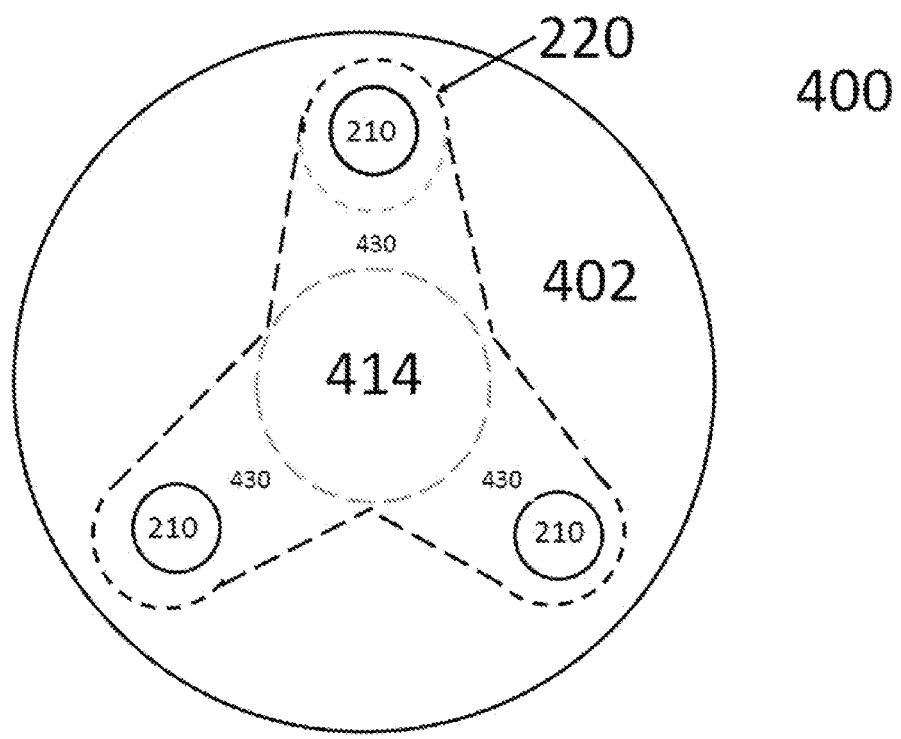
FIG. 4 is a top-down cross-sectional view of a multiple-chamber liquid reductant injection nozzle.

FIG. 4 depicts a top-down cross-sectional view of a multiple-chamber liquid reductant injection nozzle 400. The multiple-chamber liquid reductant injection nozzle 400 includes a third portion 402 defining a central entrance section 414 and multiple liquid delivery channels 430. In some implementations, the liquid delivery channels 430 are equally angularly spaced relative to the central entrance section 414. For instance, the three liquid delivery channels 430 shown in FIG. 4 may be spaced 120 degrees apart from each other.

Each of the liquid delivery channels 430 terminates at a respective first cylindrical opening 220 of a hollow cylindrical static chamber 202, as shown in FIG. 2. While FIG. 4 depicts the multiple-chamber liquid reductant injection nozzle 400 with three liquid delivery channels 430, the multiple-chamber liquid reductant injection nozzle 400 can have any number of liquid delivery channels 430 (each corresponding with one hollow cylindrical static chamber 202, one hollow frustoconical converging section 206, and one sharp edged type discharge orifice 210), such as two, four, five, six, seven, eight, nine, ten, etc.

The central entrance section 414 is in fluid communication with the multiple liquid delivery channels 430. Each liquid delivery channel 430 is in fluid communication with a respective hollow cylindrical static chamber 202, which is in turn in fluid communication with a respective hollow frustoconical converging section 206, which is in turn in fluid communication with a respective sharp edged type discharge orifice 210. Thus, this forms a nozzle with an equal number of multiple chambers, converging sections, and discharge orifices.

The central entrance section 414 is configured to receive liquid reductant 224 from a reductant source 218. Liquid reductant 224 moves downstream from the central entrance section 414 through the liquid delivery channels 430 to each static chamber 202, entering each static chamber 202 at its first circular opening 220. The velocity of the liquid reductant 224 is reduced in the static chamber 202. As the liquid reductant 224 moves downstream through the second circular opening 222 and enters the converging section 206, the liquid reductant 224 becomes confined and gradually accelerates to a greater velocity with a minimal loss of pressure between the second circular opening 222 and the discharge orifice 210. Finally, the accelerated liquid reductant 224 is discharged through the center of the discharge orifice 210 into the exhaust stream 226, where its liquid pressure drops significantly (5 bar gage or higher) and the liquid reductant 224 becomes atomized into small droplets. Downstream of the discharge orifice 210, the droplets of liquid reductant 224 behave as a free stream spray, which minimizes the liquid reductant's 224 undesirable contact with the exterior of the first portion 204 or the second portion 208 through recirculation, impingement, or coalescence.

In particular embodiments, the static chambers 202 have a diameter below 2 millimeters, more specifically 500 microns or less, while the discharge orifices 210 have a diameter less than 250 microns, more specifically 200 microns or less. The depth of the static chambers 202 is below 500 microns. The length of the converging sections 206 is less than 1000 microns. The angle of convergence 212, measured in the converging sections 206 between a plane defining the second circular opening 222 and the side wall 208 of the converging section 206, is between 15 degrees, inclusive, and 90 degrees, more specifically 85 degrees or below. The liquid reductant 224 may be an aqueous urea solution. The exhaust stream 226 may contain pollutant gases such as oxides of nitrogen.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "a portion" is used the item can include a portion and/or the entire item unless specifically stated to the contrary.

What is claimed is:

1. A liquid reductant injector nozzle, comprising:
a solid monolithic member having a top surface, a bottom surface, and an outer peripheral surface, which defines:
a central entrance section configured to receive the liquid reductant from a reductant source,
a plurality of delivery channels extending outward from the central entrance section and configured to receive the liquid reductant from the central entrance section,
a plurality of hollow cylindrical chambers, each configured to receive the liquid reductant from a respective one of the delivery channels, and
a plurality of hollow converging sections, each configured to receive the liquid reductant from a respective one of the hollow cylindrical chambers, and each comprising a discharge orifice configured to discharge the liquid reductant, wherein each converging section has a frustoconical inner surface that converges toward the respective discharge orifice;
wherein the bottom surface of the solid monolithic member intersects and extends outward from a bottom end of each frustoconical inner surface.

2. The liquid reductant injector nozzle of claim 1, wherein a diameter of each hollow cylindrical chamber is 500 microns or less.

3. The liquid reductant injector nozzle of claim 1, wherein each frustoconical inner surface defines an angle of convergence relative to a plane of the bottom surface, and wherein each of the angles of convergence is between 15 degrees and 85 degrees, inclusive.

4. The liquid reductant injector nozzle of claim 1, wherein each of the discharge orifices has a diameter of 200 microns or less.

5. The liquid reductant injector nozzle of claim 1, wherein a top opening of each hollow cylindrical chamber is circular.

6. The liquid reductant injector nozzle of claim 1, wherein a bottom opening of each hollow cylindrical chamber is circular.

7. The liquid reductant injector nozzle of claim 1, wherein:
the plurality of hollow cylindrical chambers comprise three hollow cylindrical static chambers spaced 120 degrees apart from each other,
the plurality of hollow converging sections comprise three hollow cylindrical static chambers, and
the plurality of liquid delivery channels comprise three liquid delivery channels.

8. An apparatus, comprising:
a reductant source;
a decomposition chamber configured to convert reductant from the reductant source into ammonia;
a doser in reductant receiving communication with reductant source; and
a liquid reductant injector nozzle in reductant receiving communication with the doser and positioned so to provide the reductant to the decomposition chamber, the liquid reductant injector nozzle comprising:
a solid monolithic member having a top surface, a bottom surface, and an outer peripheral surface, which defines:
a central entrance section configured to receive the liquid reductant from a reductant source,
a plurality of delivery channels extending outward from the central entrance section and configured to receive the liquid reductant from the central entrance section,
a plurality of hollow cylindrical chambers, each configured to receive the liquid reductant from a respective one of the delivery channels, and
a plurality of hollow converging sections, each configured to receive the liquid reductant from a respective one of the hollow cylindrical chambers, and each comprising a discharge orifice configured to discharge the liquid reductant, wherein each converging section has a frustoconical inner surface that converges toward the respective discharge orifice;
wherein the bottom surface of the solid monolithic member intersects and extends outward from a bottom end of each frustoconical inner surface.

* * * * *